US006263197B1

(12) United States Patent
Shibagaki et al.

(10) Patent No.: US 6,263,197 B1
(45) **Date of Patent: *Jul. 17, 2001**

(54) TRANSMITTER/RECEIVER FOR A VEHICLE AND TRANSMISSION/RECEPTION METHOD OF THE TRANSMITTER/RECEIVER FOR VEHICLES

(75) Inventors: Yuuzi Shibagaki; Fumio Umeda; Takahisa Noda, all of Aichi-ken (JP)

(73) Assignee: Kabushiki Kaisha Tokai-Rika-Denki-Seisakusho, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,174

(22) PCT Filed: Apr. 26, 1996

(86) PCT No.: PCT/JP96/01170

§ 371 Date: Oct. 24, 1997

§ 102(e) Date: Oct. 24, 1997

(87) PCT Pub. No.: WO96/34167

PCT Pub. Date: Oct. 31, 1996

(30) Foreign Application Priority Data

Apr. 27, 1995 (JP) ..................................... 7-103928

(51) Int. Cl.[7] ..................................... H04B 1/18

(52) U.S. Cl. ..................... 455/186.1; 455/352; 380/262

(58) Field of Search ............................ 455/186.1, 352, 455/343, 420, 40, 419; 380/23, 49, 21, 42, 262, 247, 248, 271; 340/825.72, 825.31, 825.34; 714/18, 48, 52; 375/358–359

(56) References Cited

U.S. PATENT DOCUMENTS 5,369,706 11/1994 Latka .
5,563,600 * 10/1996 Miyake ............................ 341/173
5,565,812 * 10/1996 Soenen ............................ 327/558
5,598,475 * 1/1997 Soenen et al. ..................... 380/23
5,646,456 * 7/1997 Udoh et al. ....................... 307/10.5
5,646,996 * 7/1997 Latka ............................. 375/358
5,661,804 * 8/1997 Dykema et al. ..................... 380/21
5,708,307 * 1/1998 Iijima et al. ..................... 307/10.5
5,774,065 * 6/1998 Mabuchi et al. .................... 340/825.72
5,949,349 * 9/1999 Farris et al. ..................... 340/825.34
5,952,933 * 9/1999 Issa et al. ....................... 340/825.31
6,026,165 * 2/2000 Marino et al. ..................... 380/21
6,154,544 * 11/2000 Farris et al. ..................... 380/262

FOREIGN PATENT DOCUMENTS 2 276 023 9/1994 (GB) .
4-16683 1/1992 (JP) .
4-306380 10/1992 (JP) .
4-336185 11/1992 (JP) .
94 18036 8/1994 (WO) .

* cited by examiner

*Primary Examiner*—Nay Maung
*Assistant Examiner*—Sonny Trinh
(74) *Attorney, Agent, or Firm*—Nixon Peabody LLP; Thomas W. Cole

(57) ABSTRACT

A memory (30) of a transmitter (12) of a transceiver (10) for a vehicle has four writing error check areas in which "Low" is written at the beginning of a writing process and "Hi" is written at the end of the writing process. As a result, when the writing error check area is read in a data reading process, it is possible to confirm whether writing has been finished correctly. Further, there are provided four rolling code data storing areas in the memory (30). The area which is written into is changed each time a rolling code is incremented. When transmission data is read, if data within a writing error check area is "Low", data is read from the previous rolling code area, and on the basis of the read data, transmission data is generated.

8 Claims, 6 Drawing Sheets

TRANSMITTER/RECEIVER FOR A VEHICLE AND TRANSMISSION/RECEPTION METHOD OF THE TRANSMITTER/RECEIVER FOR VEHICLES

TECHNICAL FIELD

The present invention relates to a transceiver for a vehicle and a transmitting-receiving method of the transceiver for a vehicle, and more particularly to a transceiver for a vehicle and a transmitting-receiving method thereof used for remote control for unlocking a vehicle door or the like.

BACKGROUND TECHNOLOGY

Conventionally, in a transceiver for a vehicle which is used for remote control for unlocking a vehicle door or the like, a transceiver for a vehicle for preventing a vehicle theft or the like is known. An example thereof is disclosed in Japanese Patent Application Laid-Open (JP-A) No. 4-336185.

As shown in FIG. 6, in this transceiver for a vehicle, data including a variable code (which is also called a rolling code) corresponding to a number of times of operation (i.e., the total number of times a transmitter 70 is operated) is transmitted from the transmitter 70, which is provided at a wireless door lock remote controller, to a receiver 72 provided at a vehicle. At the receiver 72, when a fixed code of the received data matches the code of the receiver 72 and the rolling code and the number of times of receipt matches each other, specifically, when the rolling code of the transmitter 70 and the value of a rolling counter of the receiver 72, which is synchronous with the rolling code match, the receiver 72 receives the transmitted data. Accordingly, for example, when another person operates the transmitter 70 several times without pointing the same toward the vehicle, and thereafter operates the transmitter 70 while pointing the same toward the receiver 72 of the vehicle, because the rolling code and the number of times of receipt do not match, the receiver 72 does not receive the transmitted data However, when the owner of the vehicle operates the transmitter 70 several times while mistakenly riot pointing the same toward the vehicle, and thereafter operates the transmitter 70 while pointing the same toward the receiver 72 of the vehicle, the number of times of receipt by the receiver 72 is jump-updated by a predetermined operation (i.e., the number of times of receipt, which is the number of times the transmitter 70 was operated without being pointed toward the vehicle, is added) so that the receiver 72 can receive the transmitted data.

However, in this transceiver for a vehicle, when a battery of the transmitter becomes weak or the like, there is the possibility that transmission data into which an incorrect rolling code has been written may be generated at and transmitted by the transmitter. In this case, even if the number of times of receipt by the receiver 72 is jump-updated by a predetermined operation, there is the possibility that the rolling code and the number of times of receipt will not match.

In view of the aforementioned, it is an object of the present invention to provide a transceiver for a vehicle and a transmitting-receiving method thereof in which errors in the transmission of a rolling code can be prevented.

DISCLOSURE OF THE INVENTION

The present invention is a transceiver for a vehicle, comprising: a transmitter including: an operation section; a data generating section for generating transmission data formed of a fixed code, a rolling code corresponding to a number of times of operation of the operation section, and transmission information; a modulation section for modulating the transmission data; and a transmission section for transmitting the modulated transmission data, and a receiver including: a receiving section for receiving the transmission data transmitted from the transmitter; a demodulation section for demodulating the received data; and a data decoding section for judging, on the basis of the fixed code and the rolling code, whether data may be received, wherein the transmitter has transmission data record means into which the transmitted transmission data is written, a plurality of rolling code data storing areas for storing current rolling code data and past rolling code data being provided within the transmission data record means, and on the basis thereof, the transmitter generates transmission data.

Further, the transmission data record means has a writing error check area for storing writing error check data which expresses whether a rolling code has been written correctly, and at the data generating section, it is judged whether rolling code data is correct on the basis of the writing error check data within the writing error check area, and on the basis of the judgment, one of current rolling code data and past rolling code data is read. When it is judged by the judgment that the rolling code data is correct, current rolling code data is read from the rolling code data storing area, and when it is judged by the judgment that the rolling code data is incorrect, past rolling code data is read from the rolling code data storing area.

Moreover, a transmitting-receiving method of a transceiver for a vehicle comprising the steps of: preparing a transceiver for a vehicle comprising: a transmitter including: an operation section; a data generating section for generating transmission data formed of a fixed code, a rolling code corresponding to the number of times of operation of the operation section, and transmission information; a modulation section for modulating the transmission data; a transmission section for transmitting the modulated transmission data; and transmission data record means having a writing error check area, for storing writing error check data expressing whether a rolling code has been written correctly, and a plurality of rolling code data storing areas, for storing current rolling code data and past rolling code data, the transmitted transmission data being written into the transmission data record means, and a receiver including: a receiving section for receiving the transmission data transmitted from the transmitter; a demodulation section for demodulating the received data; and a data decoding section for judging, on the basis of the fixed code and the rolling code, whether data may be received; reading the data recorded in the transmission data record means; judging at the data generating section whether data in the writing error check area is read correctly; reading one of current rolling code data and past rolling code data on the basis of the judgment; transmitting the read data via the modulation section and the transmission section; and receiving, by the receiver, the transmitted data.

In accordance with the transceiver for a vehicle and the transmitting-receiving method thereof of the present invention, when the transmitter transmits transmission data to the receiver, the transmitted rolling code data is written into the transmission data record means. During the writing operation, for example, when a battery becomes weak or the like and the rolling code data is therefore not written correctly, a writing error check data which expresses that the rolling code data has not been written correctly is stored in the writing error check area.

Next, when the transmitter transmits transmission data to the receiver, on the basis of the writing error check data in the writing error check area, it is judged whether the rolling code data is correct. At the data generating section, when it is judged that the rolling code data is correct, current rolling code data is read from the transmission data record means, and on the basis of the read data, transmission data is generated. When it is judged that the rolling code data is incorrect, past rolling code data is read from the transmission data record means, and on the basis of the read data, transmission data is generated. As a result, an excellent effect can be obtained that errors in the transmission of a rolling code can be prevented.

PREFERRED EMBODIMENTS FOR IMPLEMENTING THE PRESENT INVENTION

Figure 1:
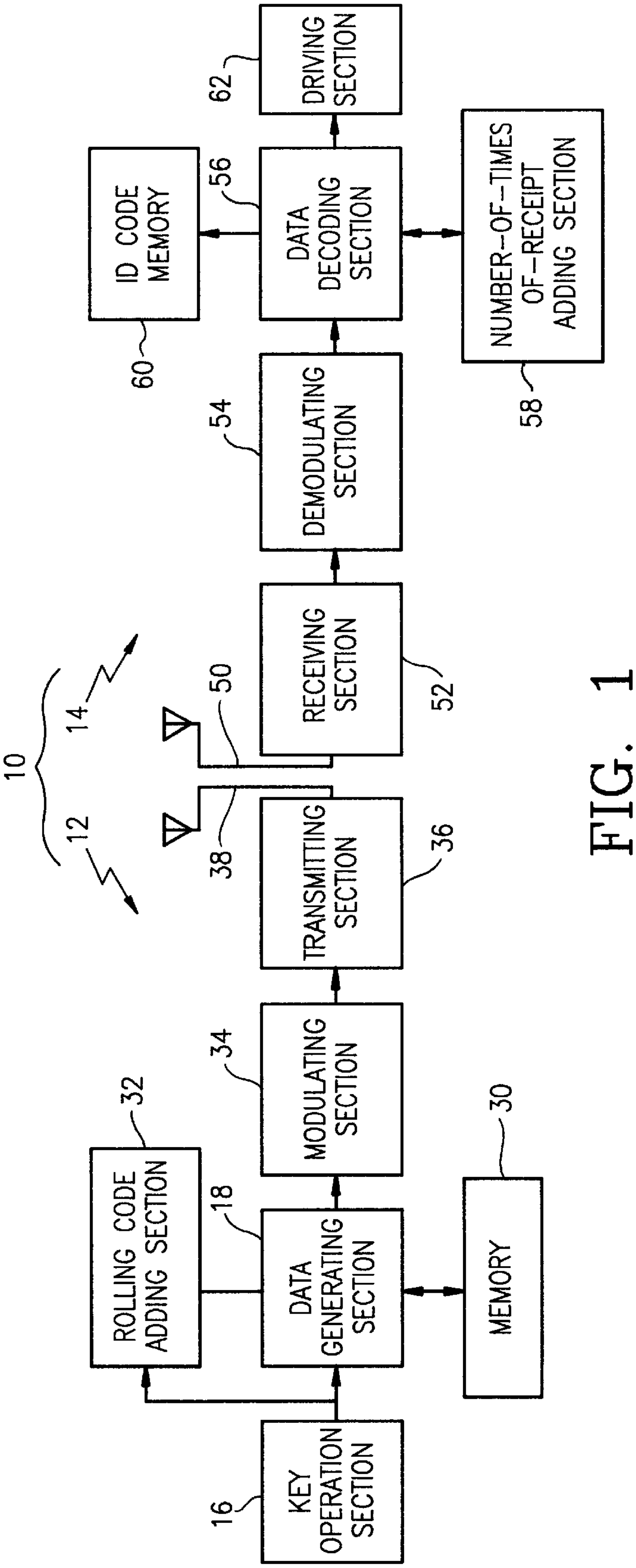
FIG. 1 is a block diagram of a transceiver for a vehicle according to an embodiment of the present invention.

A description of a transceiver for a vehicle and a transmitting-receiving method of the transceiver for a vehicle will be given hereinafter in accordance with FIGS. 1 through 3. As shown in FIG. 1, a transceiver 10 for a vehicle according to an embodiment of the present invention is structured by a transmitter 12 and a receiver 14. The transmitter 12 is provided at a wireless door lock remote controller, and the receiver 14 is provided at a vehicle.

The transmitter 12 has a key operation section 16, and a data generating section 18 for generating transmission data. As shown in FIG. 3, serial transmission data 26, in which a particular ID code 20, a rolling code 22, and instruction data 24 are lined up, is generated at the data generating section 18.

As shown in FIG. 1, the transmitter 12 has a memory 30 which serves as a transmission data record means and into which the transmitted transmission data is recorded. For example, an E2PROM is used for the memory 30. The transmitter 12 also has a rolling code adding section 32 which adds to a rolling code the number of times the key operation section 16 is operated.

Further, the data generating section 18 functions to select instruction data corresponding to the predetermined instruction information inputted by the key operation section 16. Prior to the predetermined data which has been selected by the data generating section 18, serial transmission data to which a particular ID code and a rolling code have been added is generated.

Subsequent to the data generating section 18, a modulating section 34 and a transmission section 36 are provided. FM (number of times modulation) or the like is effected by the modulating section 34 on the transmission data generated by the data generating section 18, and the modulated transmission data is transmitted from an antenna 38 by the transmission section 36.

Figure 2:
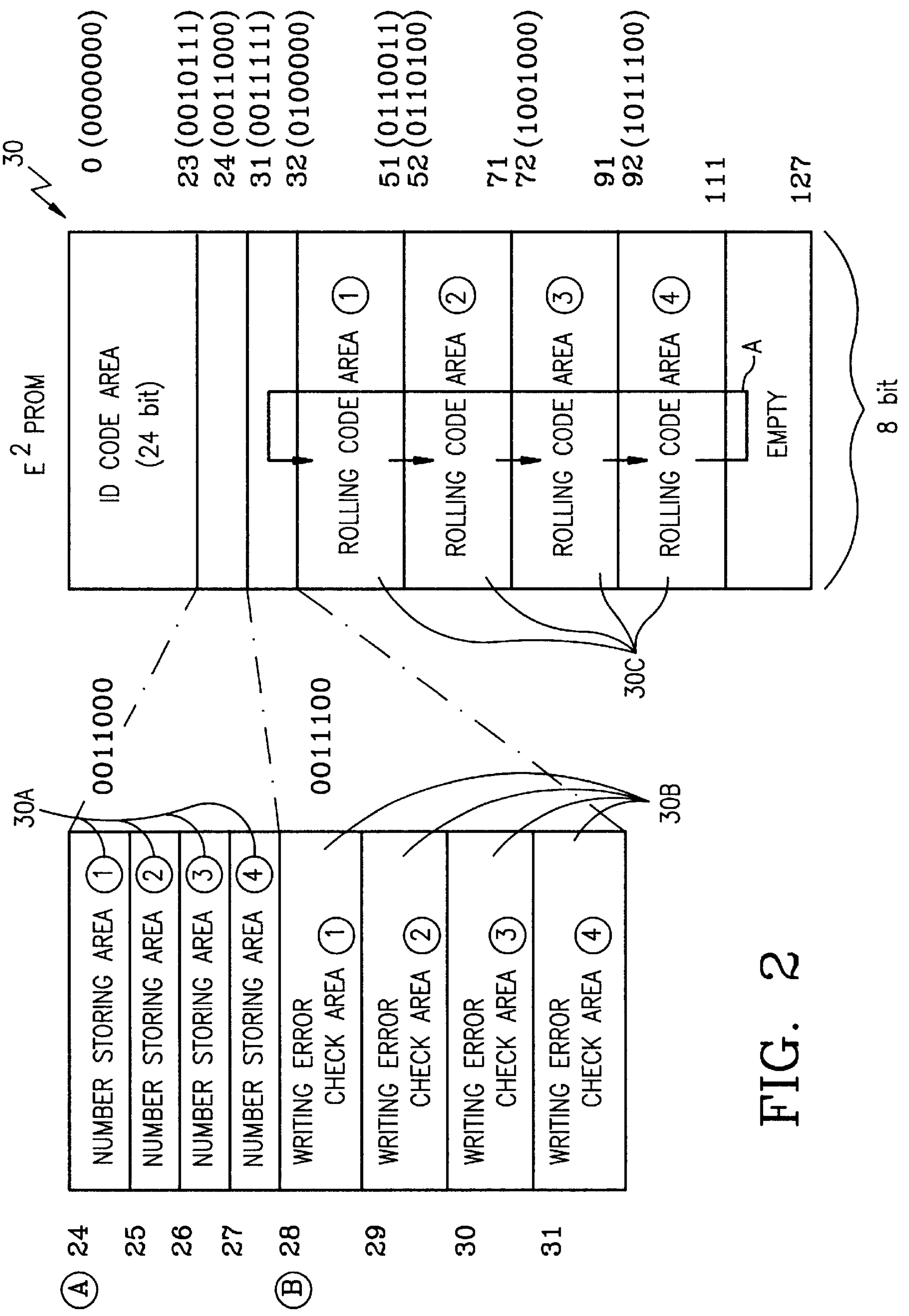
FIG. 2 is an explanatory diagram of a memory of a transmitter of the transceiver for a vehicle according to the embodiment of the present invention.
Figure 3:
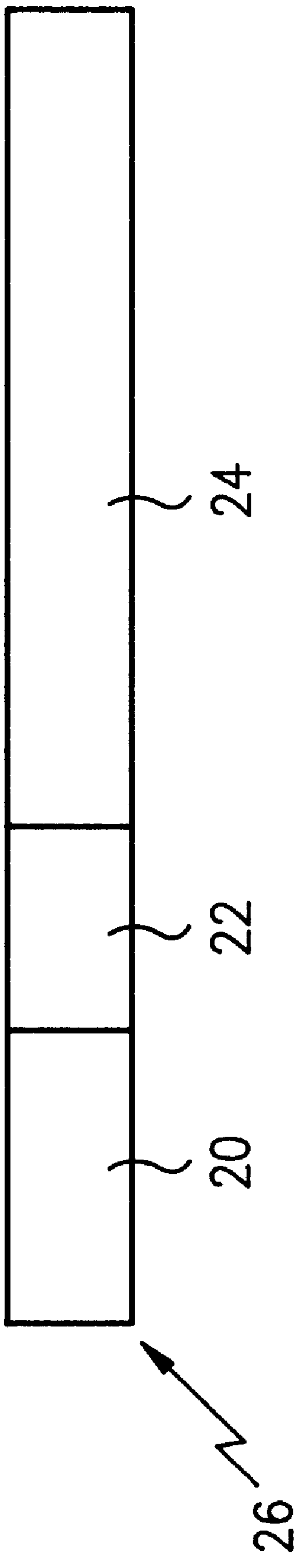
FIG. 3 is an explanatory diagram of the structure of the transmission data of the transceiver for a vehicle according to the embodiment of the present invention.

As shown in FIG. 2, the memory 30 has 4 bytes (four areas) of number storing areas 30A for storing the numbers of rolling code areas therein. If two or more of the four number storing areas 30A are incorrect, it is judged that the number storing areas have been read incorrectly.

The memory 30 includes 4 bytes (four areas) of writing error check areas 30B in which "Low" is written at the beginning of a writing process, while "Hi" is written at the end of the writing process. Therefore, when the writing error check area is read in a data reading process, it can be confirmed whether the data writing has been finished incorrectly. More specifically, when Hi:Low=4:4, it is judged that incorrect writing has been effected (Low). When two or more of the four writing error check areas are incorrect, it is judged that the writing error check areas 30B have been read incorrectly.

The memory 30 also has 4 bytes (four areas) of rolling code writing areas 30C serving as rolling code data storing areas for storing current rolling code data and past rolling code data therein. Each time a rolling code is incremented, the area into which a rolling code is written is changed as indicated by arrow A in FIG. 2.

As shown in FIG. 1, the receiver 14 is provided with a receiving section 52 for receiving transmission data from an antenna 50, and a demodulation section 54 for demodulating the received data Subsequent to the demodulation section 54, a data decoding section 56, a number-of-times-of-receipt adding section 58, and an ID code memory 60 are provided.

A particular ID code which is the same as that stored in the memory 30 of the transmitter 12 is stored in the ID code memory 60. A predetermined number of times of receipt is added by the number-of-times-of-receipt adding section 58 each time the data decoding section 56 judges that the ID code of the received data and the ID code stored in the ID code memory 60 match each other.

The data decoding section 56 compares the particular ID code from the received and demodulated data with the ID code stored in the ID code memory 60, and compares a rolling code (the code corresponding to the number of transmission by a transmitter) with the number-of-times-of-receipt code added by the number-of-times-of-receipt adding section 58. When the particular ID code and the rolling code match the aforementioned codes, respectively, the data decoding section 56 receives the data, recognizes an operation corresponding to instruction data, and outputs a predetermined a predetermined drive instruction to a driving section 62. The driving section 62 effects unlocking of a vehicle door, lighting of interior lights, lighting of headlights, or the like via a driving mechanism such as a solenoid, a motor, a switch, or the like.

Next, operation of the present embodiment will be described.

Figure 4:
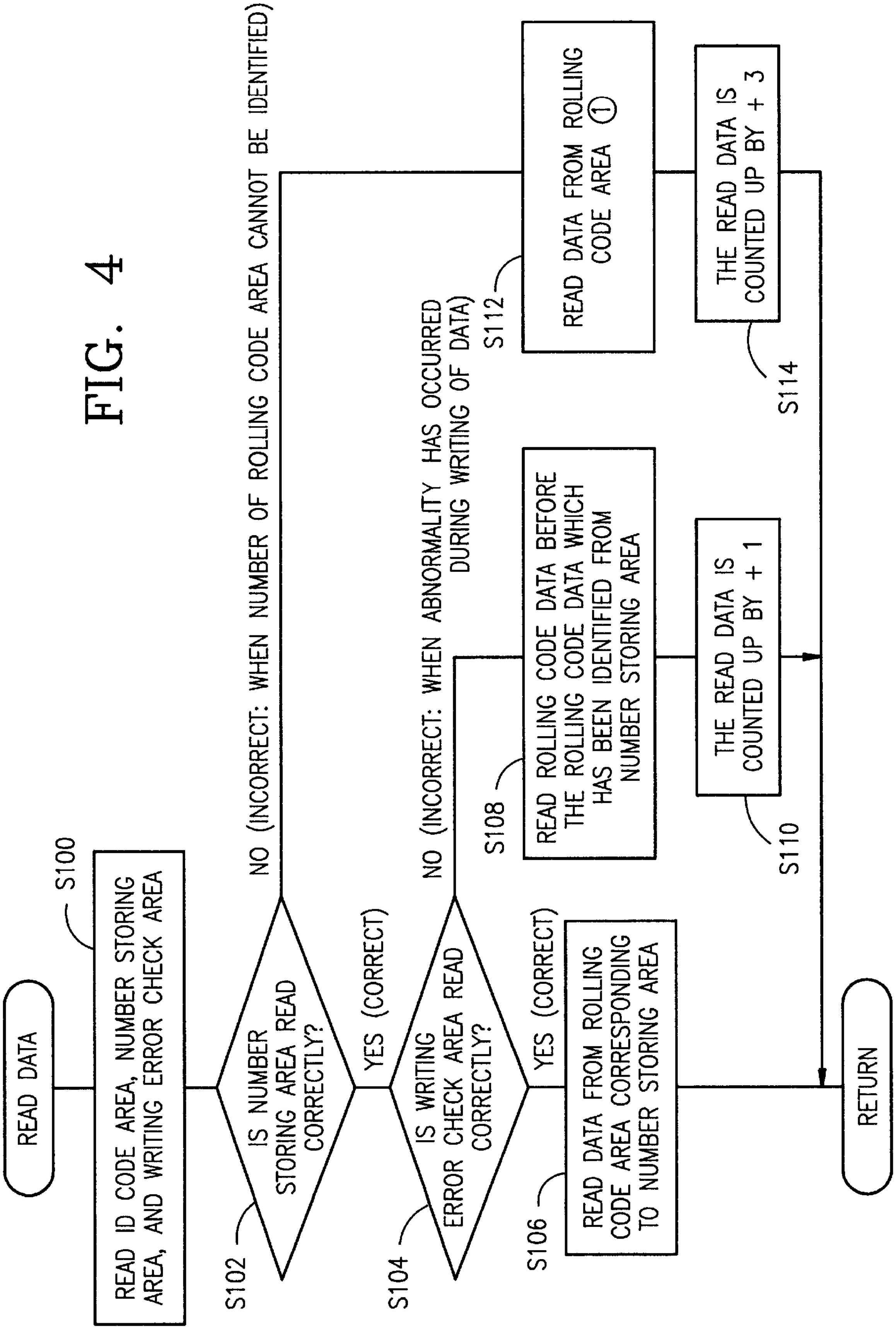
FIG. 4 is a flow chart illustrating data reading control of the transceiver for a vehicle according to the embodiment of the present invention.

In accordance with the transceiver 10 for a vehicle, first, with regard to the predetermined instruction information input at the key operation section 16, transmission data is generated at the data generating section 18 and is stored in the memory 30. Next, as shown in FIG. 4, at the data generating section 18 of the transmitter 12, an ID code area, a number storing area, and a writing error check area are respectively read from the memory 30 (Step 100).

Next, a judgment is made as to whether the number storing area has been read correctly (Step 102).

When the answer to the judgment in Step 102 is affirmative, namely, in a case in which the number storing area has been read correctly, then, it is judged whether the writing error check area has been read correctly (Step 104).

When the answer to the judgment in Step 104 is affirmative, namely, in a case in which the writing error check area has been read correctly, rolling code data is read from a rolling code area corresponding to the number storing area (Step 106).

The transmission data thus generated is modulated by the modulation section 34 and transmitted from the antenna 38 by the transmission section 36.

Figure 5:
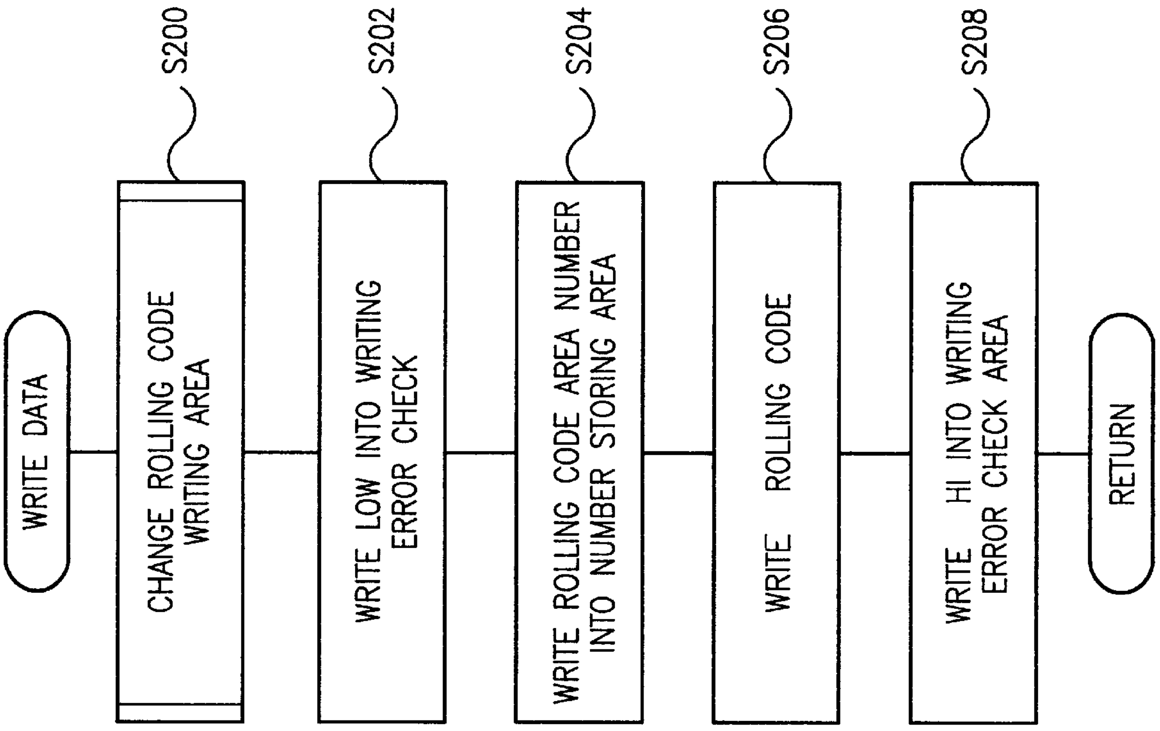
FIG. 5 is a flow chart illustrating data writing control of the transceiver for a vehicle according to the embodiment of the present invention.
Figure 6:
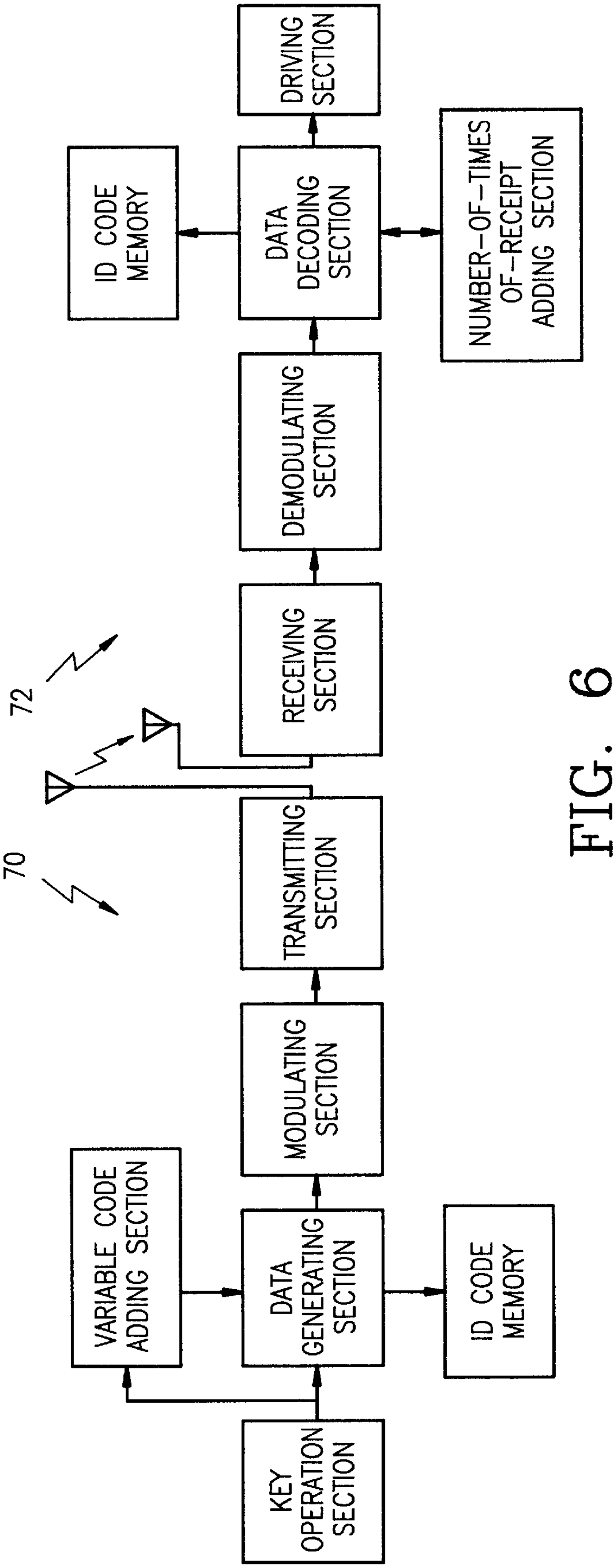
FIG. 6 (PRIOR ART)
FIG. 6 is a block diagram of a transceiver for a vehicle according to a conventional example.

On the other hand, at the data generating section 18, the transmitted transmission data is written into the memory 30. Specifically, as shown in FIG. 5, the rolling code writing area at which writing is carried out is changed to the next rolling code area as indicated by arrow A in FIG. 2 (Step 200).

Next, "Low" is written into the writing error check area (Step 202). A rolling code area number is written into the number storing area (Step 204). Next, a rolling code is written into the rolling code writing area (Step 206). Finally, "Hi" is written into the writing error check area (Step 208).

Accordingly, during the rolling code writing operation, when a battery becomes weak or the like, the writing error check area remains "Low".

Accordingly, thereafter, in a case in which the battery is exchanged and the key operation section 16 is operated, because the writing error check area is "Low", as shown in FIG. 4, the answer to the judgment in Step 104 is negative, i.e., it is judged that the writing error check area has been read incorrectly, namely, it is judged that an abnormality has occurred during the writing of data. For this reason, the process proceeds to Step 108 in which a rolling code data is read from a rolling code area before the rolling code area which has already been identified in Step 102 from the number storing area. Then, the process proceeds to Step 110 in which the rolling code data is counted up by +1.

Accordingly, even when the battery becomes weak or the like and a correct rolling code cannot be written, errors in the transmission of the rolling code can be prevented.

Further, in the present embodiment, when the answer to the judgment in Step 102 is negative, that is, when it is judged that the number storing area has been read incorrectly, more specifically, when the numbers of the rolling code areas cannot be identified, the process proceeds to Step 112 in which data is read from the highest rolling code area ① in FIG. 2. The process proceeds to Step 114 in which the data is counted up by +3. For this reason, even when the number of the rolling code area cannot be identified, errors in the transmission of the rolling code can be prevented.

In the transceiver for a vehicle of the present invention, in order to improve the reliability of the device, 4 bytes (four areas) of each of number storing area 30A, the writing error check area 30B, and the rolling code area 30C are provided within the memory 30. However, these areas are not limited to 4 bytes (four areas).

POTENTIAL USE IN THE INDUSTRY

As described above, the transceiver for a vehicle and the transmitting-receiving method of the transceiver for a vehicle according to the present invention are suited for use in particular in a transceiver for a vehicle which is used for remote control or the like for unlocking a vehicle door or the like.

What is claimed is:

1. A transceiver for a vehicle, comprising:

a transmitter including: an operation section; a data generating section for generating transmission data formed of a fixed code, a rolling code corresponding to a number of times of operation of the operation section, and transmission information; a modulation section for modulating the transmission data; and a transmission section for transmitting the modulated transmission data, and a receiver including: a receiving section for receiving the transmission data transmitted from said transmitter; a demodulation section for demodulating the received data; and a data decoding section for judging, on the basis of the fixed code and the rolling code, whether data may be received, wherein said transmitter has transmission data record means for recording transmitted transmission data, a plurality of rolling code data storing areas for storing current rolling code data and past rolling code data being provided within said transmission data record means, and on the basis thereof, said transmitter generates transmission data, and wherein said transmission data record means has a writing error check area for storing writing error check data which expresses whether a transmitted rolling code has been written correctly, and at said data generating section, it is judged whether rolling code data is correct on the basis of the writing error check data within said writing error check area, and on the basis of said judgment, one of current rolling code data and past rolling code data is read.

2. A transceiver for a vehicle according to claim 1, wherein, when it is judged by said judgment that the rolling code data is correct, current rolling code data is read from the rolling code data storing area, and when it is judged by said judgment that the rolling code data is incorrect, past rolling code data is read from the rolling code data storing area.

3. A transceiver for a vehicle according to claim 1, wherein said transmission data record means is an $E^2$PROM.

4. A transmitting-receiving method of a transceiver for a vehicle comprising the steps of:

preparing a transceiver for a vehicle comprising:

a transmitter including: an operation section; a data generating section for generating transmission data formed of a fixed code, a rolling code corresponding to the number of times of operation of said operation section, and transmission information; a modulation section for modulating the transmission data; a transmission section for transmitting the modulated transmission data; and transmission data record means having a writing error check area, for storing writing error check data expressing whether a rolling code has been written correctly, and a plurality of rolling code data storing areas, for storing current rolling code data and past rolling code data, the transmitted transmission data being written into said transmission data record means, and a receiver including: a receiving section for receiving the transmission data transmitted from said transmitter; a demodulation section for demodulating the received data; and a data decoding section for judging, on the basis of the fixed code, the rolling code, whether data may be received;

wherein the method includes the steps of:

recording transmitted transmission data into said transmission data record means;

reading the data recorded in said transmission data record means;

determining at said data generating section whether data in the writing error check area representative of a transmission rolling code was written correctly;

reading one of current rolling code data and past rolling code data on the basis of said determination;

transmitting the read data via said modulation section and said transmission section; and receiving by said receiver, the transmitted data.

5. A transmitting-receiving method of a transceiver for a vehicle according to claim 4, wherein, when it is judged by said judgment that the data in the writing error check area has been read correctly, current rolling code data is read from the rolling code data storing data, and when it is judged by said judgment that the data in the writing error check area has been read incorrectly, past rolling code data is read from the rolling code data storing area.

6. A transmitting-receiving method of a transceiver for a vehicle according to claim 4, further comprising the steps of:

prior to said judgment, judging whether a number storing area for storing the number of a rolling code area provided at said transmission data record means is read correctly; and on the basis of said judgment, reading one of current rolling code data and past rolling code data.

7. A transmitting-receiving method of a transceiver for a vehicle according to claim 6, wherein when it is judged the number storing area is read incorrectly, past rolling code data is read.

8. A transmitting-receiving method of a transceiver for a vehicle according to claim 4, further comprising the step of: writing the transmitted data into said transmission data record means.

* * * * *